United States Patent Office 3,363,467
Patented Jan. 16, 1968

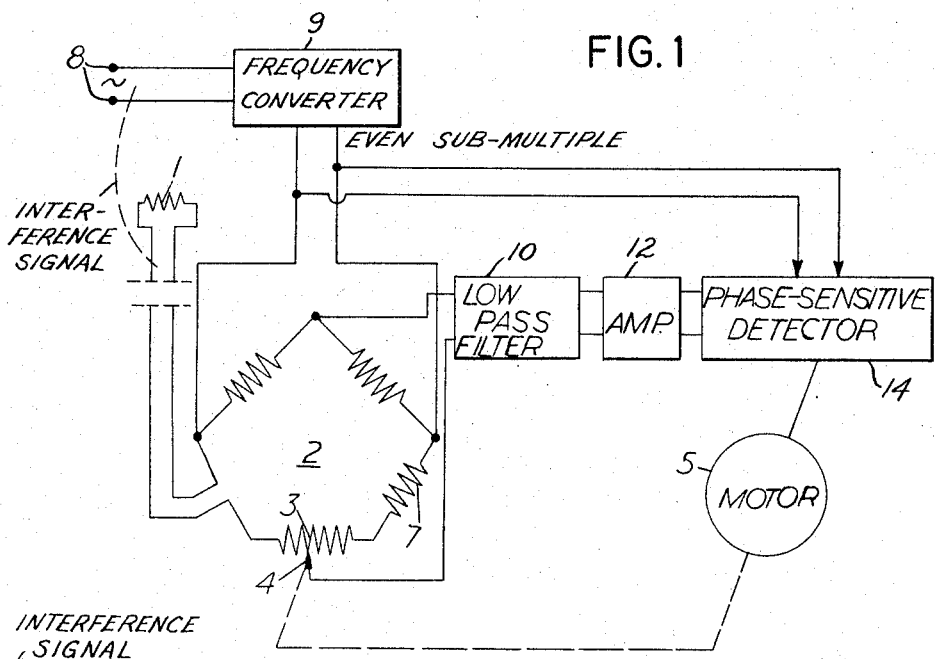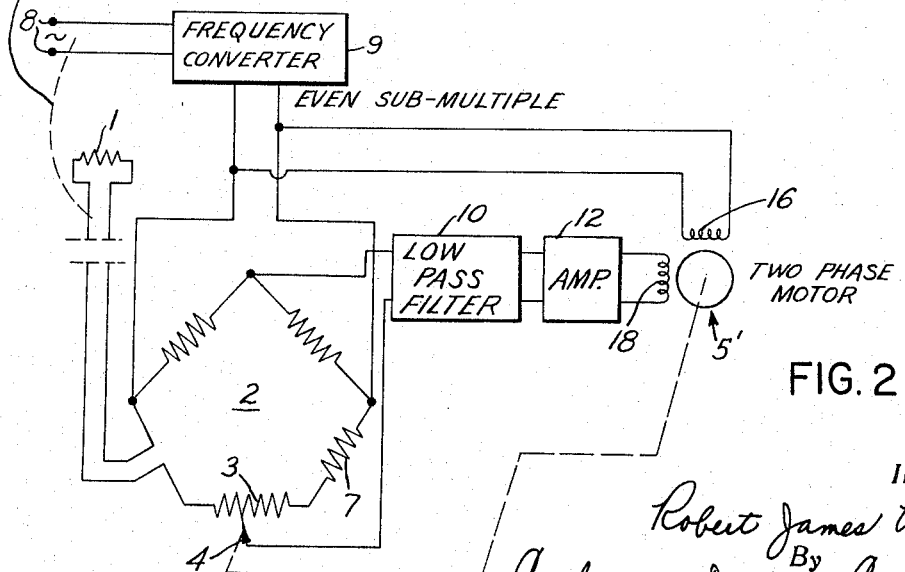

3,363,467
METHODS OF MEASUREMENT APPLICABLE IN THE IMPROVEMENT OR CONTROL OF MANUFACTURE
Robert James Weir, Norton-on-Tees, England, assignor to Imperial Chemical Industries Limited, London, England, a corporation of Great Britain
Filed July 30, 1965, Ser. No. 476,082
4 Claims. (Cl. 73—362)

ABSTRACT OF THE DISCLOSURE

A system to eliminate the effects of an undesired interfering frequency induced in transmission lines from a sensing transducer to a measuring circuit. The power supply for the measuring circuit is selected to be an even sub-multiple of the interfering frequency and a phase-sensitive detector in this measuring circuit is also referenced to this same even sub-multiple frequency.

---

This invention relates to methods of measurement and to apparatus therefor.

In testing operations on, for instance, chemical plant or in the continuous control of such plant, it is often desirable to be able to measure a physical quantity, for example, temperature, flow of liquids, pressure, mechanical strain and the like using an appropriate detector or transducer, which is preferably connected to an impedance bridge circuit and null-point detection apparatus by long leads or cables. When a high degree of sensitivity is desired, such as for instance in resistance thermometry a sensitivity of full scale deflection of the measuring instrument for a temperature range of about 1° C., electricity supply frequency (hereinafter referred to as the mains frequency) pick up becomes a serious problem. Similarly other relatively low frequencies of the order of the mains frequency might be picked up if present, and interfere with the measurements made.

It is a primary object of this invention to provide a method of measurement using a detector which substantially reduces interference from external sources.

It is a further object of this invention to provide a method of measurement using a detector connected by cable to a remote bridge circuit in which interference pick-up by the cable is substantially eliminated.

It is also an object of this invention to provide measuring apparatus for carrying out the above methods. Still further objects and advantages of the invention will be apparent from the following description.

According to the invention the detector, which term is herein intended to include transducers, is positioned to produce a response indicating the value of the physical quantity to be measured and the response is interpreted by means of a phase sensitive detector which is set to a reference frequency which is an even sub-multiple of an interfering frequency so that the average value of the interfering signal over one cycle of the reference frequency is zero. A current produced by interfering frequencies which are multiples of the interference frequency for which the phase sensitive detector is set also produce an average signal of zero over one cycle. The actuating current need not, of course, go through a full cycle to achieve the advantages of this invention.

The detector or transducer may be directly coupled to feed an amplifier which then feeds the phase sensitive detector, or the feed to the amplifier may be indirect by way of one or more potentiometers, in which cases the output of the phase sensitive detector is used to give an indication of the physical quantity to be measured. However, a null detection method is preferred, being in general more accurate, wherein the detector or transducer is connected to an impedance bridge network, which is connected to a null-point detection apparatus comprising the amplifier and phase sensitive detector, measurement being made by varying the impedance of at least one of the arms of the bridge network until the null-point is found.

The detector or transducer may be fed with direct current provided that at some later stage this is converted into an alternating current signal to which the phase sensitive detector is sensitive. However, it is preferred that the detector or transducer be fed with an alternating current to which the phase sensitive detector is sensitive. Thus in general it is most practicable and convenient to feed the measuring circuit with an alternating current at the same frequency as that at which the phase sensitive detector is set. This alternating current is preferably generated from, and synchronised with, the mains or other interfering frequency.

Because an alternating current having a frequency of half the mains frequency is readily generated from the mains frequency, using for instance a bi-stable circuit (e.g. an Eccles-Jordan relay supplied by half wave rectified mains current), it is preferred to set the phase sensitive detector at half the mains frequency and to supply the measuring circuit with such frequency. There are however other, less attractive, possibilities, such as the use of a quarter of the mains frequency with a phase sensitive detector set at such frequency, or the use as a fundamental of a sixth of the mains frequency with the phase sensitive detector set at half the mains frequency.

Since there may be, under some conditions of use, a considerable degree of mains pick-up which is nevertheless rejected by the phase sensitive detector, it is an optional feature of the invention to use a low-pass or band-pass filter to reduce the unwanted mains frequency current and thereby prevent overloading of the amplifier or other parts of the detection apparatus.

A resistance thermometry method and apparatus in accordance with the invention are now described with reference to the accompanying drawing.

FIGURE 1 is a schematic and block diagram of one embodiment of the invention, and FIGURE 2 represents another embodiment of the invention.

In FIGURE 1 a resistance thermometer element 1 is connected in a resistance bridge network 2, such that two of the four arms thereof consist of the element 1, the potential divider 3 having a slider 4 driven by the reversible electric motor 5, and a resistor 7. The bridge network is fed by an exemplary 50 c./s. A.C. supply 8 through a frequency converter 9 to develop an even sub-multiple frequency, for example a frequency of 25 c./s., and the output of the bridge network is fed through a low-pass filter 10 adjusted to reject frequencies above about 40 c./s., through an amplifier 12 to a phase sensitive detector 14 set at a reference frequency of 25 c./s. by virtue of its connection to the output of frequency converter 9. Interference is caused by the pickup of the 50 c./s. mains frequency by the cable or line from resistance element 1. The output of the phase sensitive detector is used to drive the motor 5 until the slider 4 reaches a position corresponding with the null-point. The slider is connected to a chart recorder (not shown) and a permanent record is thereby obtained.

Any suitable form of phase sensitive detector may be used to drive the motor. Alternatively, the motor may also act as the phase sensitive detector by using a two phase motor 5' (FIGURE 2) having a flux winding 16 and a power winding 18. The reference frequency current from converter 9 is fed to the flux winding whilst the output from the amplifier is fed to the power winding so that the output of the motor will be independent of the interfering frequency.

It is also possible to dispense with the motor and use a variable resistance which is adjustable electronically, e.g. a semiconductor. In any event, a phase sensitive detector is necessary in the associated circuitry and the output of this detector is used to balance the bridge. The bridge need not, of course, be a resistance bridge and, if desired, it could be applied to transformer bridge circuits.

The invention is particularly useful when applied to resistance thermometry or resistive strain gauges but it may also be applied in the measurement of a variety of physical quantities. The invention is valuable, for example, when applied to measurement of physical quantities in connection with the control of chemical plant.

I claim:

1. Apparatus for measuring a physical quantity comprising
    a detector responsive to said physical quantity
    a bridge network incorporating said detector,
    a variable resistance in an arm of said bridge network,
    a two phase motor having a flux winding and a power winding,
    an amplifier, connecting means connecting the output of said bridge network to said amplifier and the output of said amplifier to the power winding of the motor,
    means for varying the resistance of the variable resistance in response to movement of the motor and thereby indicating the value of the physical quantity,
    said bridge network being subject to having induced therein undesirable signals from an alternating current source of a particular frequency, and
    means for feeding alternating current to the bridge network and the flux winding from said alternating current source at an even sub-multiple of the frequency of the source to prevent interference from the source frequency.

2. In a method of measuring a physical quantity in which a first detector produces a response indicating the value of said quantity, an alternating current from a supply source is applied to the first detector, and the response of the first detector is sensed as an alternating signal of the applied frequency by a phase sensitive detector referenced to that frequency, which phase sensitive detector produces an indication of the value of the quantity, and in which the measuring circuit may have induced therein undesirable signals of the frequency of the alternating current supply source,
    the improvement which comprises supplying said alternating current both to the first detector and as a reference signal to the phase sensitive detector from said alternating current supply source at an even sub-multiple of the frequency of that source to prevent interference from the source frequency.

3. A measuring device which comprises,
    (i) an alternating current impedance bridge network comprising an element responsive to a quantity to be measured, said bridge network being subject to having induced therein undesirable signals from an alternating current source of a particular frequency,
    (ii) a phase sensitive detector coupled to receive an output signal of the bridge network,
    (iii) means responsive to the phase sensitive detector to produce an indication of a value of the quantity to be measured, and
    (iv) means to supply alternating current to the bridge network and a reference signal to the phase sensitive detector from a source of alternating current at an even sub-multiple of the particular frequency of the first mentioned source to prevent interference therefrom.

4. A device as in claim 3 in which the means responsive to the phase sensitive detector serves to balance the bridge network and thereby to produce an indication of the value of the quantity to be measured.

References Cited
UNITED STATES PATENTS

| | | | |
|---|---|---|---|
| 2,698,406 | 12/1954 | Arrott | 73—362 |
| 2,799,758 | 7/1957 | Hutchins | 73—362 |
| 2,891,218 | 6/1959 | Werts | 73—362 |

LOUIS R. PRINCE, *Primary Examiner.*

FREDERICK SHOON, *Assistant Examiner.*